United States Patent [19]

Harris

[11] Patent Number: 5,065,922

[45] Date of Patent: Nov. 19, 1991

[54] CONTAINER HOLDING SYSTEM

[76] Inventor: Charles C. Harris, 1611 Manufacturers Dr., St. Louis, Mo. 63026

[21] Appl. No.: 486,118

[22] Filed: Feb. 28, 1990

[51] Int. Cl.⁵ .......................... B60R 7/02; B65D 85/50
[52] U.S. Cl. .............................. 224/42.32; 224/42.42;
224/273; 224/901; 296/37.6; 296/39.1;
248/205.2; 206/423; 206/516; 206/518; 47/84;
108/44
[58] Field of Search ............ 224/901, 273, 279, 42.32,
224/42.33, 42.34, 42.38, 42.42; 296/37.1,
37.5-37.8, 37.14, 37.15, 37.16, 39.1, 39.2;
108/44; 248/205.2; 206/423, 516, 518, 335, 423;
47/84; 2/DIG. 6

[56] References Cited

U.S. PATENT DOCUMENTS

| | | | |
|---|---|---|---|
| 2,150,453 | 3/1939 | Munford et al. | 206/423 X |
| 3,513,969 | 5/1970 | Roff | 224/901 X |
| 3,869,828 | 3/1975 | Matsumoto | 47/84 |
| 3,908,830 | 9/1975 | Skrzelowski | 248/205.2 X |
| 3,922,455 | 11/1975 | Brumlik | 2/DIG. 6 X |
| 4,271,566 | 6/1981 | Perina | 2/DIG. 6 X |
| 4,285,082 | 8/1981 | Cox | 224/901 X |
| 4,291,494 | 9/1981 | Knablein et al. | 47/84 X |
| 4,512,503 | 4/1985 | Gioso | 224/42.42 |
| 4,621,733 | 11/1986 | Harris | 206/423 |
| 4,733,809 | 3/1988 | Pursell | 224/901 X |
| 4,762,258 | 8/1988 | Murphy | 224/273 |
| 4,789,574 | 12/1988 | Selvey | 296/39.2 X |
| 4,846,382 | 7/1989 | Foultner et al. | 224/42.42 |
| 4,936,046 | 6/1990 | Miller | 206/423 X |

OTHER PUBLICATIONS

Design/Craft-7227 Oak Park Avenue, Niles, Illinois, 60" Velvet Loop Fabric (brochure), pp. #1-#7.

Primary Examiner—Henry J. Recla
Assistant Examiner—Casey Jacyna
Attorney, Agent, or Firm—Cohn, Powell & Hind

[57] ABSTRACT

This container system can be used for a delivery van (10) having an interior floor covering (18) providing the loop component of a hook and loop fastener. The floor covering provides attachment for a tray (24) having VELCRO strips (32) on the bottom (26) providing the hook component of the hook and loop fastener. The tray (24) can have tapered sides (28) adapted to receive the compatibly configured container (40) of a relatively tall floral package (22). The floral package (22) includes a cooperating, tapered sleeve (42) which is sandwiched between the two containers when the floral package (22) is placed within the awaiting tray (24). The gripping interaction between the VELCRO strips (32) on the tray (24) and the floor covering (18) resists the tendency of the package to overturn and slide.

6 Claims, 2 Drawing Sheets

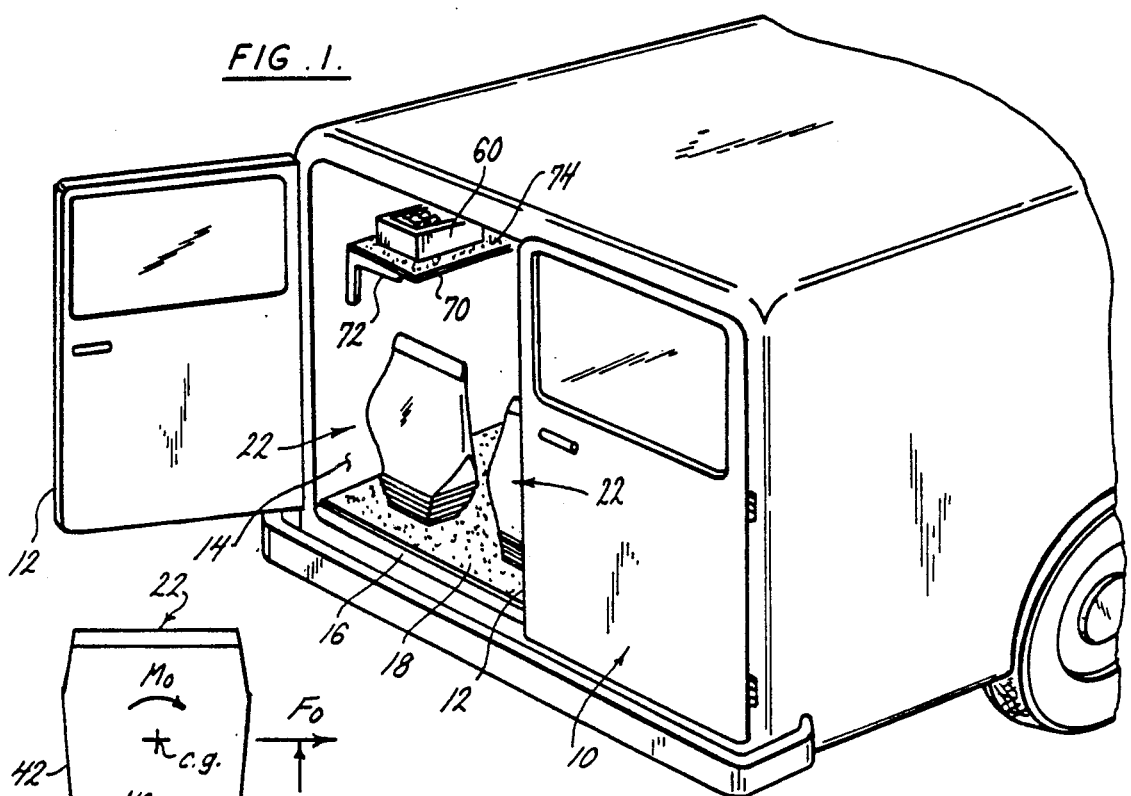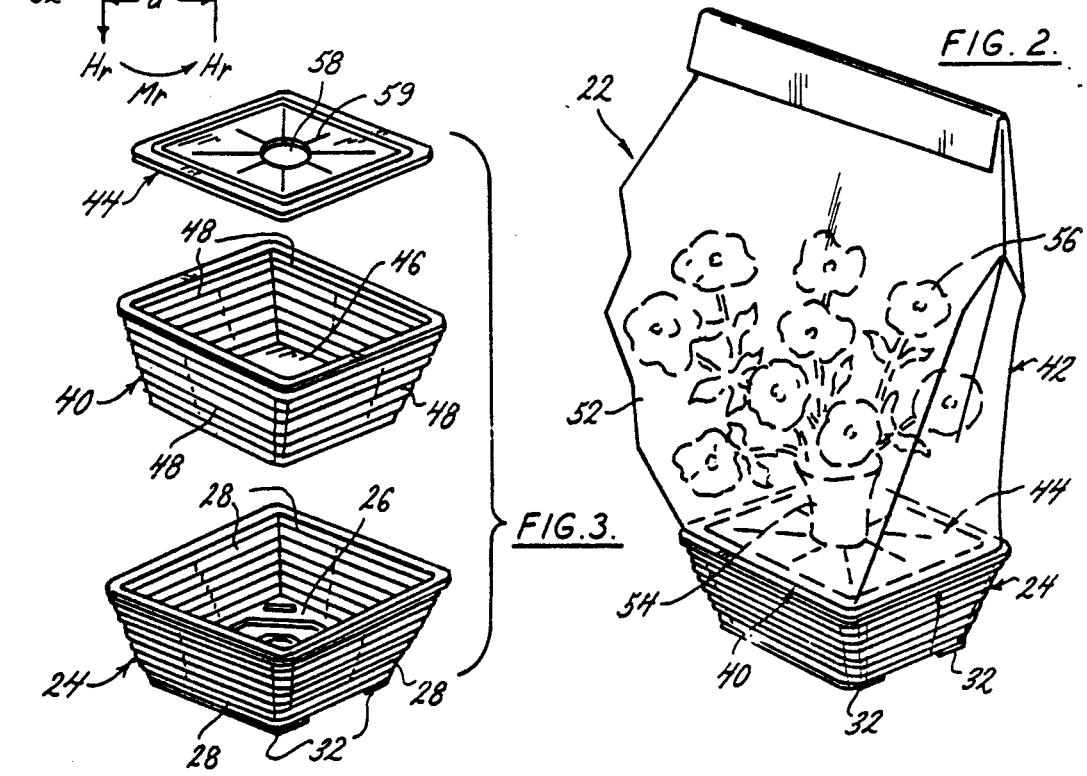

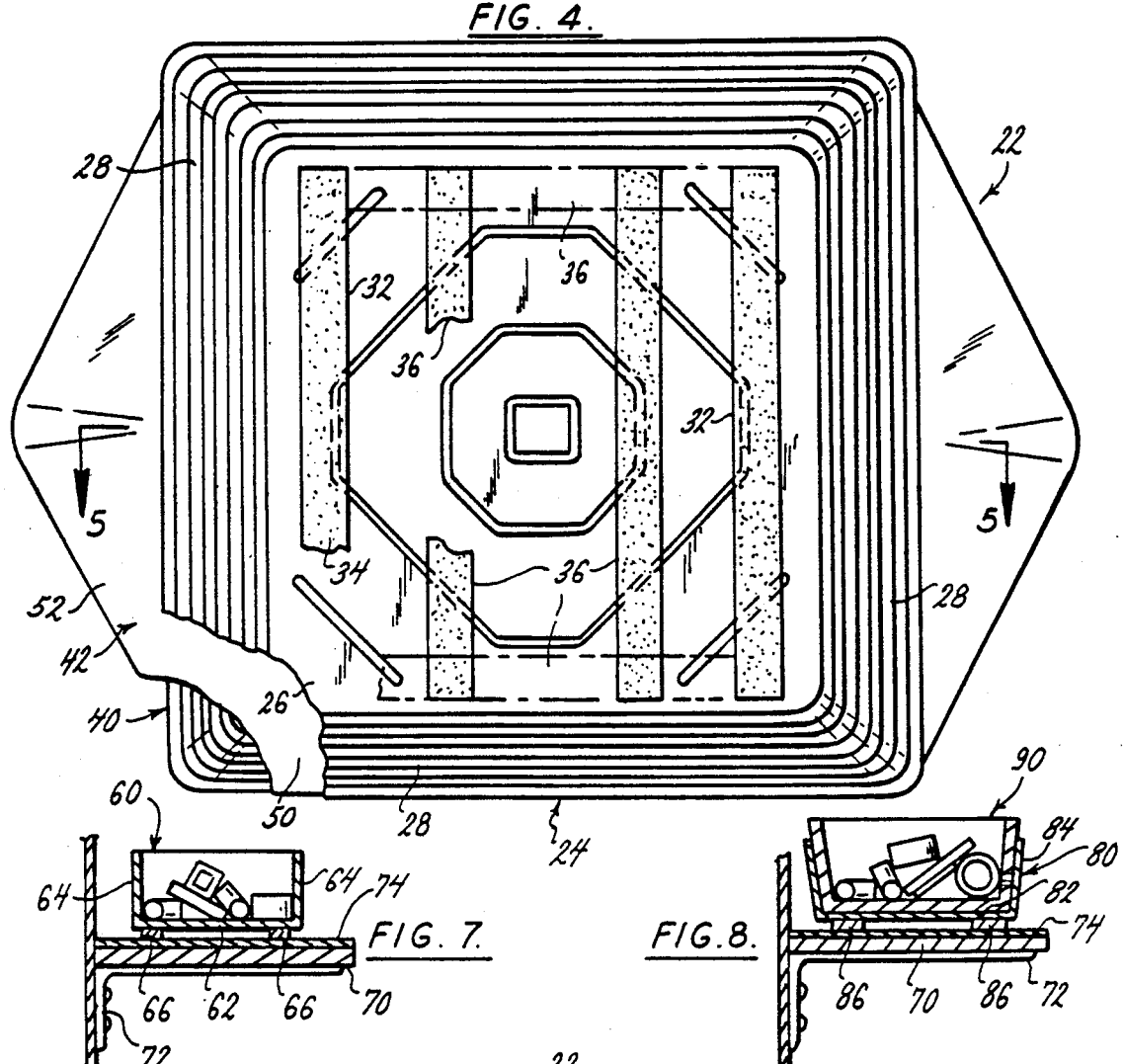
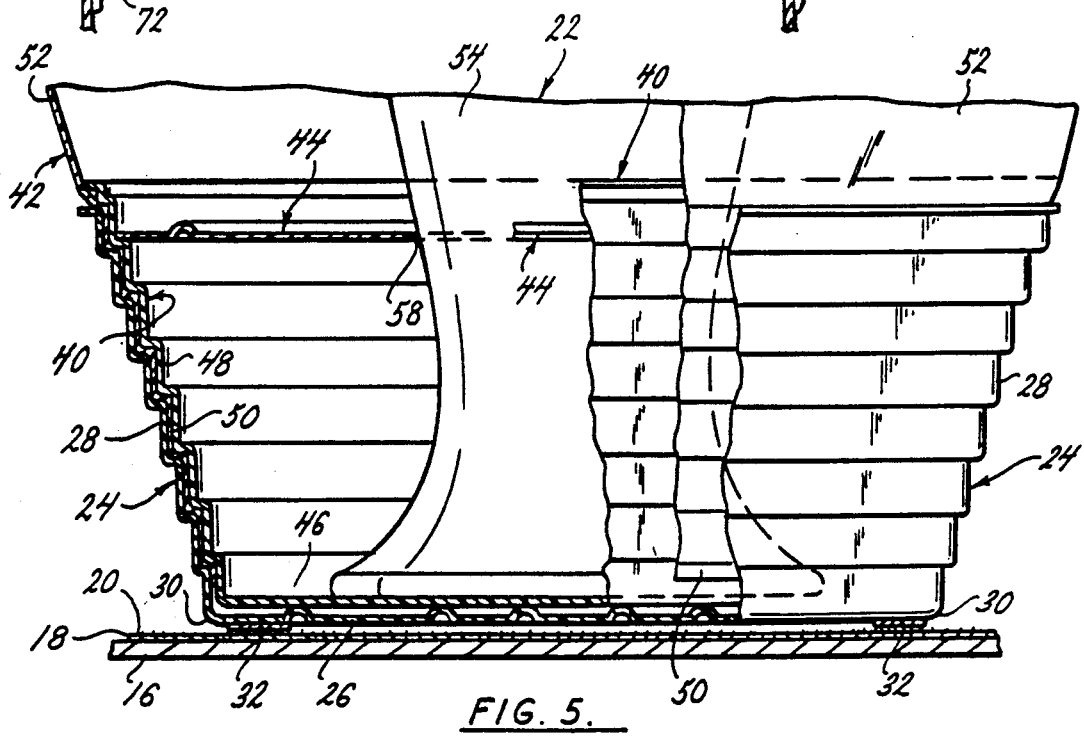

CONTAINER HOLDING SYSTEM

BACKGROUND OF THE INVENTION

This invention relates generally to the holding of articles in a moving vehicle and particularly to the holding of such articles by hook and loop fasteners against the action of overturning and sliding forces during transit.

Holding articles securely in a moving vehicle, while in transit, presents a problem because of the tendency of such articles to overturn and slide under the action of forces resulting primarily from acceleration and deceleration during stopping and starting of the vehicle and also when the vehicle is turning. Tall and relatively lightweight articles, such as floral packages, are particularly susceptible to overturning which can result in damage to the floral arrangements within the package and even breakage of the container.

This holding system provides a solution to these and other problems which is not disclosed in the known prior art.

SUMMARY OF THE INVENTION

This container holding system provides an effective means for holding packages in place at selected locations in a moving vehicle and is particularly effective in holding relatively tall packages against overturning and sliding forces encountered during transit.

It is an aspect of this invention to provide a system of holding a container in place in a moving vehicle, the system comprising a generally horizontal interior floor or shelf portion of the vehicle, having a floor covering attached thereto, the floor covering having an upper surface corresponding to a loop component of a hook and loop fastener, and a container having a bottom and sidewall portions, the container bottom having hook component portions of a hook and loop fastener means fixedly secured to spaced portions thereof, and cooperating with said hook component portions of said container bottom to hold the container in place in response to overturning and sliding forces resulting from acceleration and turning of the vehicle.

It is another aspect of this invention to provide a second, compatibly configured container removably received within the first container.

It is still another aspect of this invention to provide that the first and second containers have compatibly tapered sidewalls whereby said containers interfit each other in nested relation.

It is yet another aspect of this invention to provide that said second container includes a closure having an article-receiving opening and providing a stiffener for the upper portion of the nested containers.

In another aspect of this invention the hook component portions are elongate strips adhesively attached to opposed sides of the first container bottom.

In still another aspect of this invention a sleeve is provided for the second container, the sleeve having a lower portion overfitting the second container and being received in sandwich relation between said first and second containers.

In yet another aspect of the invention the first and second containers are of inverted frusto-pyramid configuration and in still another aspect the sidewalls of the first and second container are formed in a compatible stepped configuration.

In another aspect of this invention the floor covering is formed from synthetic foam-backed pile material.

It is an aspect of this invention to provide a method of holding a container in place in a moving vehicle, the method comprising the steps of covering at least a portion of the vehicle interior with a floor covering having an upper surface corresponding to a loop component portion of a hook and loop fastener means; fixedly securing hook component portions of a hook and loop fastener means to spaced portions of the bottom of the container, and pressing the bottom of the container into engagement with the floor covering to substantially hold the container in place against overturning and sliding forces resulting from acceleration and turning of the vehicle.

It is an aspect of this invention to provide a holding system that is inexpensive, easy to install and use and extremely effective for its intended purpose.

BRIEF DESCRIPTION OF THE DRAWINGS

FIG. 1 is a rear perspective view of a delivery van with a rear door open to show the interior floor and shelving;

FIG. 2 is a perspective view of a floral package;

FIG. 3 is an exploded view of the floral package;

FIG. 4 is a plan view of the underside of the tray, and

FIG. 5 is a cross-sectional view taken on line 5—5 of FIG. 4.

FIG. 6 is a diagrammatic view showing the overturning and resistance forces;

FIG. 7 is a cross-sectional view through a shelf, carrying a container, and;

FIG. 8 is a similar view showing the shelf carrying a compound container.

DESCRIPTION OF THE PREFERRED EMBODIMENT

Referring now by reference numerals to the drawings and first to FIG. 1 it will be understood that FIG. 1 shows a delivery van 10 with one of the rear doors 12 open to reveal the interior 14. As shown, the interior of the vehicle includes a floor 16 fitted with a floor covering 18. A shelf 70, fitted with a similar covering material, is also shown.

In the preferred embodiment, the floor covering 18 is a carpet of a tight loop type which provides an outer surface 20, corresponding to a loop component of a hook and loop fastener means, to which the conventional hook component of such a fastener means can readily attach. The floor covering 18 can also be of a synthetic material such as that manufactured under the trademark VELVET LOOP FABRIC by Design Craft of Niles, Ill. This material is a 100% nylon fabric with a polyester foam core and acetate jersey backing equivalent to a tight loop material and provides an effective loop component.

The van 10 can be used for the delivery of floral packages, indicated by numeral 22, which are placed in trays 24. The trays 24 are selectively attachable to and detachable from the carpet surface 20 as will now be described with reference to FIGS. 2-5.

The tray 24, which constitutes a first container, is of an inverted frusto-pyramid configuration in the embodiment shown, having a bottom 26 and stepped tapered sidewalls 28 and formed of relatively thin material such as plastic. The tray bottom 26 is provided with elongate indentations to improve the rigidity, and includes opposed side margins 30 adjacent to which are VELCRO strips 32 fixedly attached to the outer portion of said bottom 26, as by waterproof adhesive. The VELCRO strips 32 have an outer surface 34, which provides the hook component of a hook and loop fastener means. The outer hook surface 34 cooperates with the outer loop surface 20 of the floor covering 18 and secures the tray 24 firmly, but releasably, so that said tray can be readily removed and selectively placed at another location on the floor covering 18. In some instances VELCRO strips 36 are also attached to the inner portion of the container bottom to provide additional holding power. Strips 36 can be parallel to strips 32, as shown, or transverse, as shown in phantom outline in FIG. 4.

The tray 24, in the embodiment shown, is used to provide a holder for the floral packages 22 which will now be described.

Each floral package 22 includes essentially a container 40, constituting a second container, a tapered flexible plastic sleeve 42 and a snap-in cover 44. In the embodiment shown the container 40 is of an inverted frusto-pyramid configuration having a bottom 46 and stepped tapered sidewalls 48 compatibly formed with the tapered, stepped sidewalls 28 of tray 24 such that the container 40 conveniently interfits the tray 24 in nested relation. The tapered sleeve 42 includes a lower portion 50 which overfits the container 40 and an upper portion 52, which provides a protective cover for a vase 54 containing a floral arrangement 56. The vase 54 is carried by the container 40 and held in place by the cover 44. As shown, the cover 44 includes a central opening 58 having a plurality of radial slits 59 which facilitate the holding capability of said cover 44. A floral package of the type described above is disclosed in commonly owned U.S. Pat. No. 4,621,733, entitled Package for Horticultural Items, which is incorporated herein by reference.

The holding system described herein provides a particularly advantageous means of holding a tray 24 in place at a selected location on the floor covering 18 such that the floral package 22 can readily be placed within the tray 24 with the lower portion of the package sleeve 42 sandwiched between the compatibly configurated floral package as the container 40 is pushed into place in nested relation within the tray 24.

The cover 44, which acts as a stiffening partition for the container 40, also acts to stiffen the tray 24. Thus, even a fairly tall floral package is held firmly in place and easily resists the overturning and sliding forces acting on the package during acceleration and deceleration of the van as well as the centrifugal forces which act on the package as the van turns corners. The resistance to overturning is provided by the "couple" resulting from the holding power of the spaced apart VELCRO strips 32, effectively attached to the nap-like pile of the upper surface of the floor covering. As shown in FIG. 4 outer strips 32 are placed closely adjacent to the edges of the bottom 26 of tray 24 thereby enhancing the resistance couple of the container to overturning. Inner strips 36 provide additional resistance to overturning, where required. In addition, the frictional attachment of the VELCRO strip components to the floor covering provides a most efffective resistance to sliding forces by virtue of the connection between the intergripping hook and loop fastener components of the strips and floor covering, respectively.

FIG. 6 shows, in simplified diagrammatic form, a typical overturning force $F_o$ acting at the center of gravity (c.g.), a distance c above the floor covering outer surface 20, which creates an overturning moment $M_o$ equal to $F_o \times c$. A resistance to overturning is provided by the hold-down forces $H_r$ of the VELCRO strips 32 acting at a distance d between the said hold-down forces which creates a resistance couple $M_r$. For simplicity, the effect of the downward weight of the package is ignored. The resulting equilibrium condition is represented by $M_o = M_c$ or $F_o \times c = H_r \times d$. Thus, $H_r = F_o \times c/d$ which demonstrates that $H_r$ varies in inverse proportion to the distance d. Accordingly, the greater the distance between the strips 32, the greater the holding power of the strips. The same VELCRO strips are also highly effective in resisting overturning forces at right angles to force $F_o$ although the couple distance is reduced. Because the strips 32 are effective in providing resistance in two directions, the attachment is capable of resisting not only acceleration forces resulting from stopping and starting of the vehicle but also centrifugal forces resulting from cornering. In addition, the frictional attachment of the strips 32 provides a most effective resistance $F_r$ to sliding forces resulting from force $F_o$. The friction of resistance is also effective in two directions. While the tray 24 has been shown used in conjunction with a floral package, the tray can itself be used as a container for tools, small parts, accessories and the like.

A container of this type is indicated by numeral 60 in FIG. 1 and may be a simple rectangular box. As shown schematically in FIG. 7 the box 60 has a flat bottom 62 and straight sidewalls 64, the bottom having VELCRO strips 66 at each side. The van 10 is provided with a shelf 70 supported by bracket 72 and having a piece of floor covering 74 thereon which can be the same as that used for the floor and fulfills the same function. This arrangement permits the user such as a plumber or an electrician, for example, to simply remove the container 60 from the shelf 70 and carry it with him to the job site. Alternatively, as shown in FIG. 8 the container may be a tray 80 having a bottom 82 and frusto-pyramid or frusto-conical sides 84 and the bottom having VELCRO strips 86 at each side. A removable container 90 is provided for the tray which can be lifted out and taken by the workman to the job site.

The floor covering 18, such as VELVET LOOP FABRIC, in the preferred embodiment is adhesively attached to the floor 16 by applying a coating of adhesive to the floor with a brush or roller, allowing time for the adhesive to reach a semi-wet state. The covering is then gently pressed into place. With respect to the VELCRO strips 32, these will usually be supplied as a tape having a predetermined width typically five-eighths inch ($\frac{5}{8}$") to one inch (1") wide, a protective sensitive backing ready for instant attachment to the underside of the tray 24 on removal of the release paper.

Although the container holding system has been described by making particularized reference to preferred embodiments, the details of description are not to be understood as restrictive, numerous variants being possible within the principles disclosed and within the fair scope of the claims hereunto appended.

I claim as my invention:

1. A system for holding a container in place in a moving vehicle comprising:
   (a) a vehicle having a generally horizontal, flat floor area,
   (b) a floor covering having a relatively large area upper surface corresponding to a loop component of a hook and loop fastener means and covering a substantial portion of said floor area, (c) a first container having a bottom having an area substantially smaller than the relatively large area of the floor covering upper surface and tapered sidewall portions, said bottom having spaced apart portions, (d) hook component portions of a hook and loop fastener means fixedly attached to the first container bottom spaced apart portions and cooperating with the upper surface of the floor covering to hold the first container selectively in place on the floor area in response to forces resulting from motion of the vehicle, (e) a second, article-holding container having a bottom and compatibly tapered sidewall portions for interfitting said first container in nested relation, and (f) a sleeve for said second container having a lower portion and an upper portion, said lower portion overfitting said second container side portions and being received in sandwich relation between said first and second containers, and said upper portion providing an article protecting cover.

2. A system as defined in claim 1, in which:

(g) said second container includes a closure having an article-receiving opening and providing a stiffener for the upper portion of the nested containers.

3. A system as defined in claim 1, in which:

(g) the bottom of the first container is rectangular, and (h) the hook component portions are elongate strips adhesively attached to opposed sides of the bottom.

4. A system as defined in claim 1, in which:

(g) the first and second containers are of inverted frusto-pyramid configuration.

5. A system as defined in claim 4, in which:

(h) the sidewalls of the first and second container are formed in a compatible stepped configuration.

6. A system as defined in claim 1, in which:

(g) the floor covering is formed from synthetic foam-backed pile material.

* * * * *